United States Patent [19]

Tsuru et al.

[11] Patent Number: 5,249,009
[45] Date of Patent: Sep. 28, 1993

[54] AUTOMATIC FILM-REWINDING APPARATUS HAVING STOP MEANS FOR INTERRUPTING AUTOMATIC FILM REWINDING OPERATION

[75] Inventors: Hiroyuki Tsuru, Tokyo; Yoshikazu Iida, Chigasaki; Hiroshi Wakabayashi, Yokohama; Akira Katayama, Tokyo; Hideya Inoue, Yokohama, all of Japan

[73] Assignee: Nikon Corporation, Tokyo, Japan

[21] Appl. No.: 751,742

[22] Filed: Aug. 29, 1991

[30] Foreign Application Priority Data

Oct. 4, 1990 [JP] Japan .................. 2-265183

[51] Int. Cl.⁵ .............................. G03B 1/12
[52] U.S. Cl. ................................ 354/173.1
[58] Field of Search ............ 354/173.1, 173.11

[56] References Cited

U.S. PATENT DOCUMENTS 4,937,601 6/1990 Azuma et al. ............... 354/173.1

FOREIGN PATENT DOCUMENTS 60-178168 7/1987 Japan .
62-138588 8/1988 Japan .................. 354/173.1

OTHER PUBLICATIONS

Press Release, "Nikon Introduces New Zoom-Touch 400 . . . ", Sep. 5, 1990.
Press Release, "New Nikon Red-Eye Reduction Flash Mode . . . ", Sep. 5, 1990.
Press Release, "New Zoom-Touch 400 Camera With Carefree Autofocus . . . ", Sep. 5, 1990.
"Nikon Zoom-Touch 400", Brochure published Sep. 4, 1990.

Primary Examiner—Michael L. Gellner
Assistant Examiner—J. K. Han
Attorney, Agent, or Firm—Shapiro and Shapiro

[57] ABSTRACT

An automatic film rewinding apparatus, for use in a camera, is provided with a stopping device for interrupting an automatic film rewinding operation while such rewinding operation is conducted by the automatic film rewinding apparatus, and an operation unit for activating the stopping device, wherein the automatic film rewinding is interrupted by the stopping device only during the operation of the operation unit, but is re-started after the termination of operation of the operation unit.

5 Claims, 5 Drawing Sheets

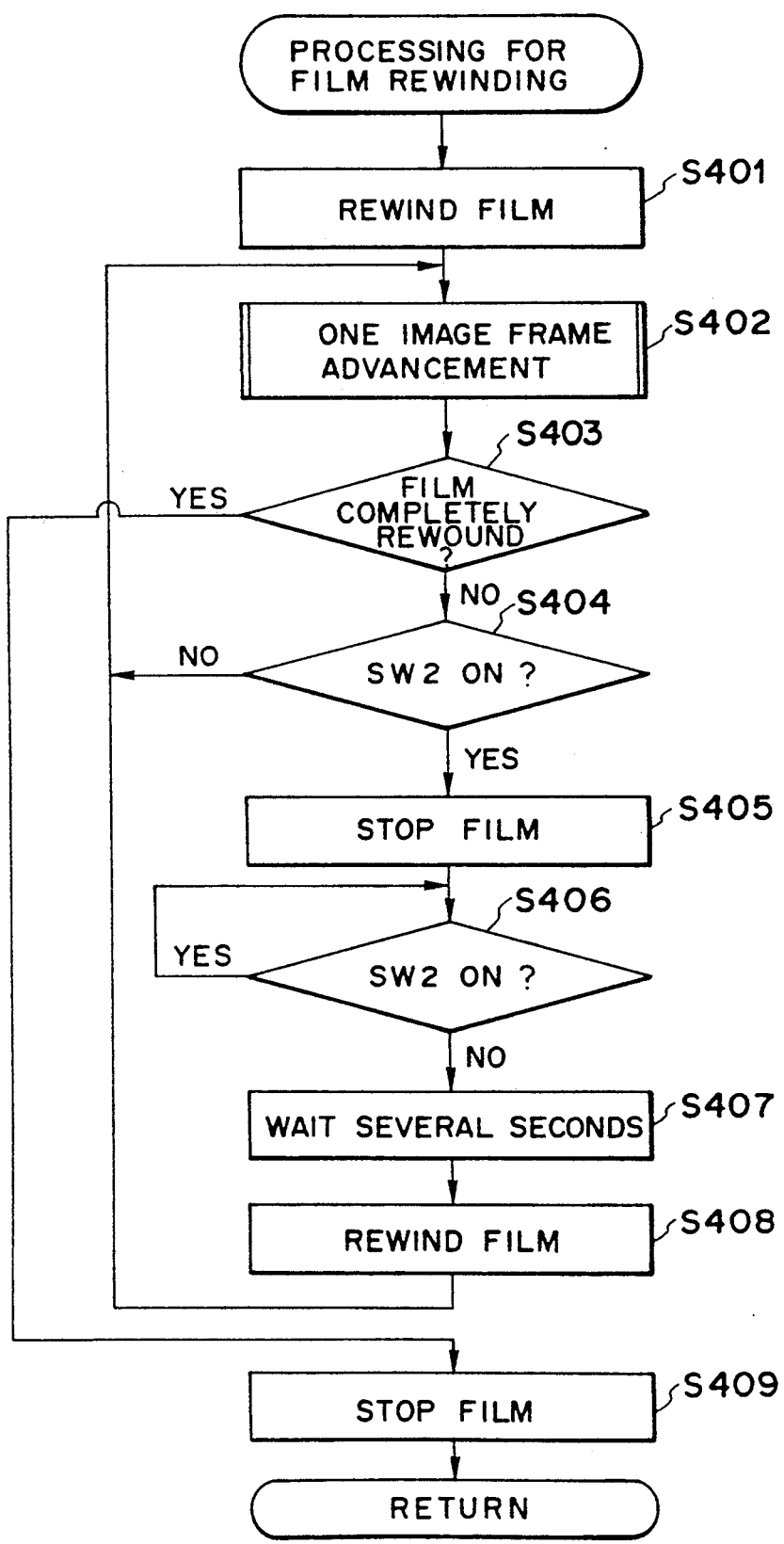

AUTOMATIC FILM-REWINDING APPARATUS HAVING STOP MEANS FOR INTERRUPTING AUTOMATIC FILM REWINDING OPERATION

BACKGROUND OF THE INVENTION

1. Field of the Invention

The present invention relates to a camera, and more particularly to an automatic film rewinding apparatus for use in a camera.

2. Related Background Art

The conventional cameras equipped with such automatic film rewinding apparatus lack the function of interrupting the automatic film rewinding in the course thereof. Certain motor drive units with automatic film rewinding apparatus, to be mounted on the camera, have such ability of interrupting the automatic film rewinding in the course thereof, but the process after the interruption has to be determined by the user.

In such conventional cameras incapable of interrupting the automatic film rewinding, the rewinding operation automatically starts once the film is advanced to the end, and the sound of such rewinding operation is often objectionably noisy if the phototaking is conducted in quiet circumstances.

Also if the film rewinding operation is started by the user and the sound thereof is then too noisy, the user is unable to interrupt the film rewinding operation in the course thereof.

On the other hand, in the motor drive unit capable of interrupting the automatic film rewinding operation, the user may forget that he has interrupted the automatic film rewinding operation and may open the unit for removing the film, thereby wasting the unrewound film.

SUMMARY OF THE INVENTION

The object of the present invention is to provide an automatic film rewinding apparatus adapted for use in a camera, enabling to interrupt the automatic film rewinding when the sound of such film rewinding is undesirable, to provide an additional function of reminding the user of a fact that he has interrupted the automatic film rewinding operation, and to maintain the film in the rewound state even if the user forgets the interrupted rewinding operation, thereby avoiding the waste of the unrewound film.

The above-mentioned object can be attained, according to the present invention, by an automatic film rewinding apparatus comprising stop means for interrupting the automatic film rewinding operation in the course of said operation conducted by said automatic film rewinding apparatus, and operation means (SW2) for enabling said stop means, wherein said stop means is activated to interrupt said automatic film rewinding operation only during the operation of said operation means (SW2) but is deactivated to continue said automatic film rewinding operation when said operation means (SW2) becomes no longer operated.

Said automatic film rewinding apparatus is further provided with discrimination means for discriminating whether said operation means (SW2) is operated, wherein said discrimination means is adapted to discriminate whether said operation means is operated at the rewinding of every image frame of the film by the automatic film rewinding apparatus, and, if said operation means (SW2) is identified to be operated, said operation means (SW2) activates said stop means thereby interrupting the automatic film rewinding operation by said automatic film rewinding apparatus.

Said automatic film rewinding apparatus is further provided with a film counter for counting the number of image frames of the film, wherein said film counter is adapted to effect a decrement at a predetermined timing in the course of and prior to the completion of rewinding of a frame of the film by said automatic film rewinding apparatus.

Said automatic film rewinding apparatus may also be constructed in such a manner that, instead of interruption of the automatic film rewinding operation by said stop means only during the operation of said operation means (SW2), the stop means continues to function to interrupt the automatic film rewinding operation for a period of several seconds to several minutes after the termination of operation of said operation means and the automatic film rewinding operation is re-started after the lapse of said period.

Furthermore, in said automatic film rewinding apparatus, said operation means (SW2) may have another process function in addition to the function for enabling said stop means, and may be so constructed as to enable said stop means only during the automatic film rewinding operation by said automatic film rewinding apparatus but to otherwise perform said another process function.

Thus, while the automatic film rewinding apparatus executes the automatic film rewinding operation, the user can arbitrarily operate the operation means (SW2), whereupon said automatic film rewinding operation is interrupted.

The user can re-start the automatic film rewinding by terminating the operation of the operation means (SW2). Such interruption and re-start of the automatic film rewinding can be executed for each image frame.

The automatic film rewinding operation of an image frame effects a down-counting of the film counter at a predetermined timing prior to the completion of said film rewinding operation.

Also the apparatus may be so constructed that the automatic film rewinding is interrupted by the operation by the user of the operation means (SW2), then remains interrupted for a period of several seconds to several minutes after the termination of said operation by the user and is re-started after the lapse of said period.

The operation means (SW2) may be so constructed to serve for the interruption of the automatic film rewinding only during such rewinding operation of the automatic film rewinding apparatus.

The above-mentioned effects can be attained not only in a camera but also in a camera system.

BRIEF DESCRIPTION OF THE DRAWINGS

FIG. 5 is a flow chart of the control sequence of a second embodiment.

DETAILED DESCRIPTION OF THE PREFERRED EMBODIMENTS

Figure 1:
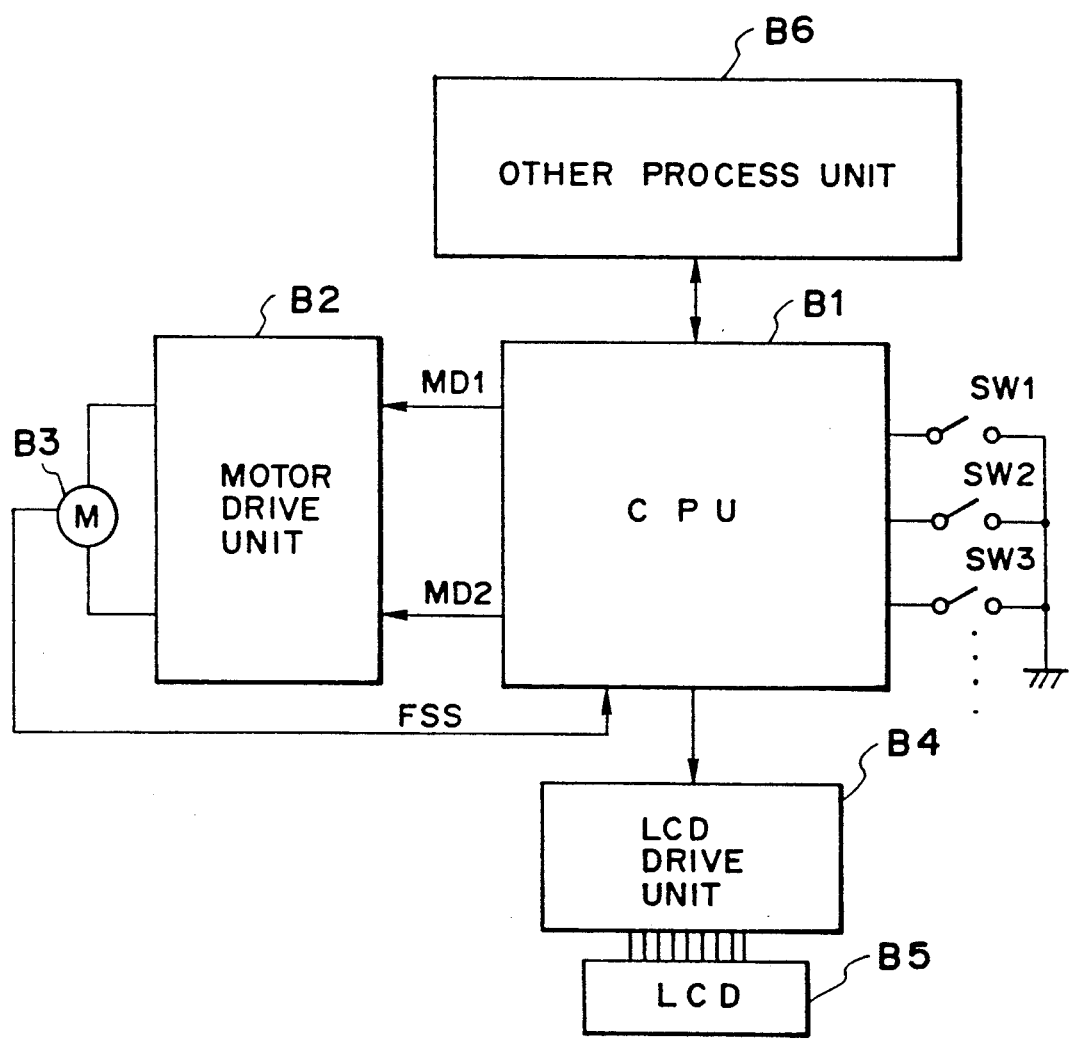
FIG. 1 is a block diagram of a first embodiment of the present invention.

Now a first embodiment of the present invention will be explained in detail in the following with reference to FIGS. 1 to 4, in which FIG. 1 is a block diagram of said embodiment.

A central processing unit (CPU) B1 controls the function of the entire camera of the present embodiment. A motor drive unit B2 receives signals MD1, MD2 from the CPU B1, and sends instructions for film advancement, rewinding and stop for a film driving motor B3. When the film is driven by said motor B3, a signal FSS, generated by a free sprocket in synchronization with the movement of the film, is fed back to the CPU B1. In the present embodiment, 4 pulses of the FSS signal are generated by the movement of the film by an image frame. However, there may naturally be selected other numbers of FSS signal pulses corresponding to an image frame. There are provided an LCD drive unit B4, and an LCD (liquid crystal display) unit B5 serving as a film counter for indicating the number of image frames of the film loaded in the camera. In response to a signal from the CPU B1, the LCD driver B4 drives the LCD unit B5 to display the image frame number thereon. Though the image frame number is displayed by the LCD B5 in the present embodiment, there may also be other display units for this purpose. Other process units B6, for other processes than the advancing or rewinding of film, such as shutter control and zooming in case of a variable focal length camera, are collectively illustrated since these units are not directly related to the control of the present embodiment. A switch SW1 is provided for starting the film rewinding operation. A switch SW2 is provided for normally effecting a predetermined operation for camera control, for example a main switch for activating the camera, but being switched to the function of interrupting the automatic film rewinding in the course of such automatic film rewinding operation. A switch SW3 collectively indicate switches for other functions of the camera.

In the following the control sequence of the present embodiment will be explained with reference to flow charts shown in FIGS. 2 to 4.

Figure 2:
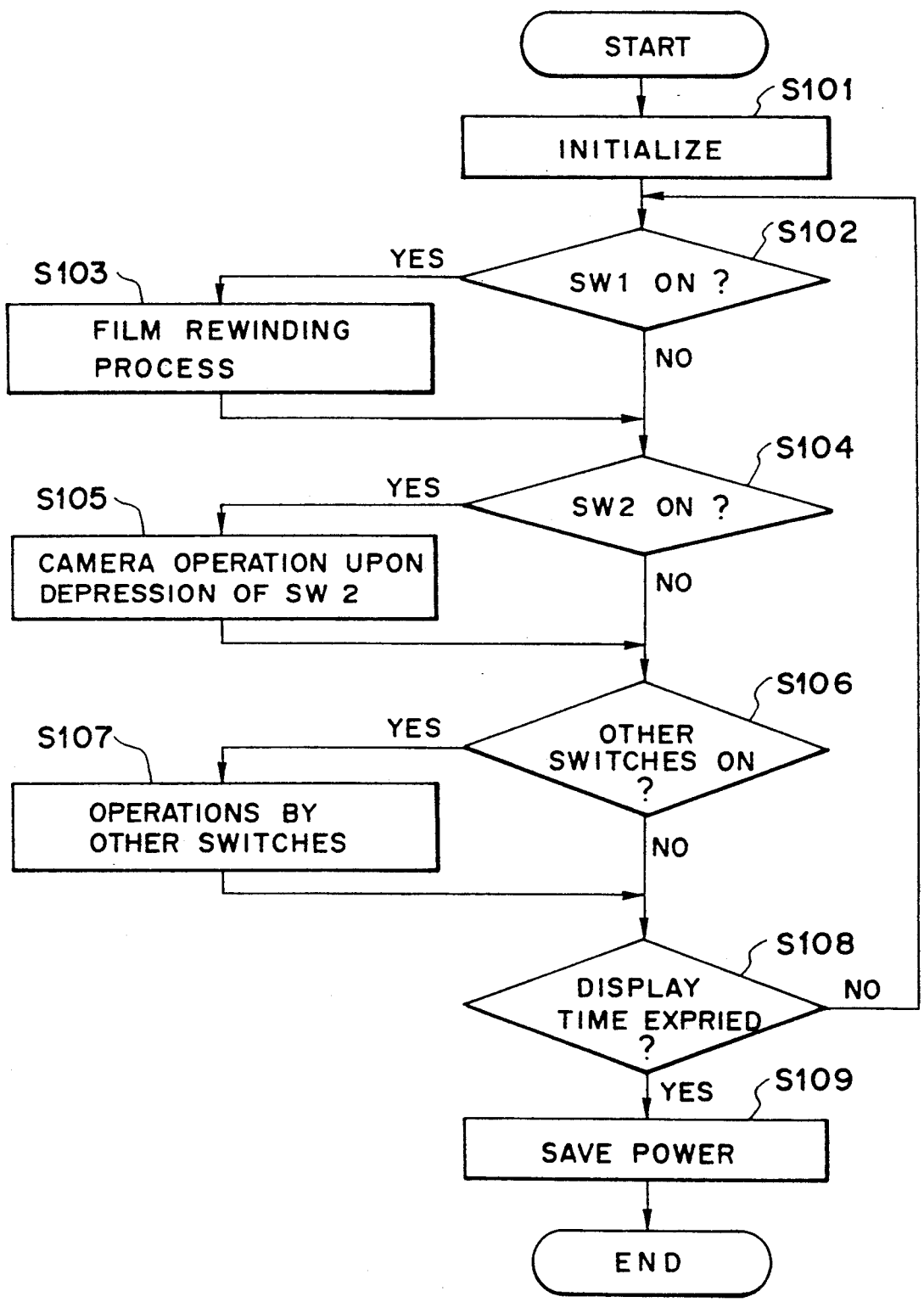
FIG. 2 is a flow chart of the control sequence until the start of function of the first embodiment.

FIG. 2 is a flow chart showing the control sequence of the entire camera.

When the camera is activated at first, a step S101 effects initialization of the camera.

Then a step S102 discriminates whether the switch SW1 has been depressed, and the sequence proceeds to a step S103 or S104 respectively if said switch SW1 has been depressed or not. The step S103 effects an automatic film rewinding process shown in FIG. 3, and then the sequence proceeds to the step S104. The step S104 discriminates whether the switch SW2 has been depressed, and the sequence proceeds to a step S105 or S106 respectively if the switch SW2 has been depressed or not. The step S105 executes a camera operation predetermined for the depression of the switch SW2, and then the sequence proceeds to the step S106. The step S106 discriminates whether other switches SW3 have been depressed, and the sequence proceeds to a step S107 or S108, respectively if said other switches SW3 have been depressed or not. The step S107 executes camera operations predetermined for the depression of such other switches SW3, and then the sequence proceeds to the step S108. The step S108 discriminates whether the time for displaying camera mode, film counter etc. has expired, and, if not, the sequence returns to the step S102 thereby repeating the steps S102 to S108. If the step S108 identifies that the display end time has been reached, a step S109 executes a power saving process for turning off the power supply, whereby the camera operation is terminated.

Figure 3:
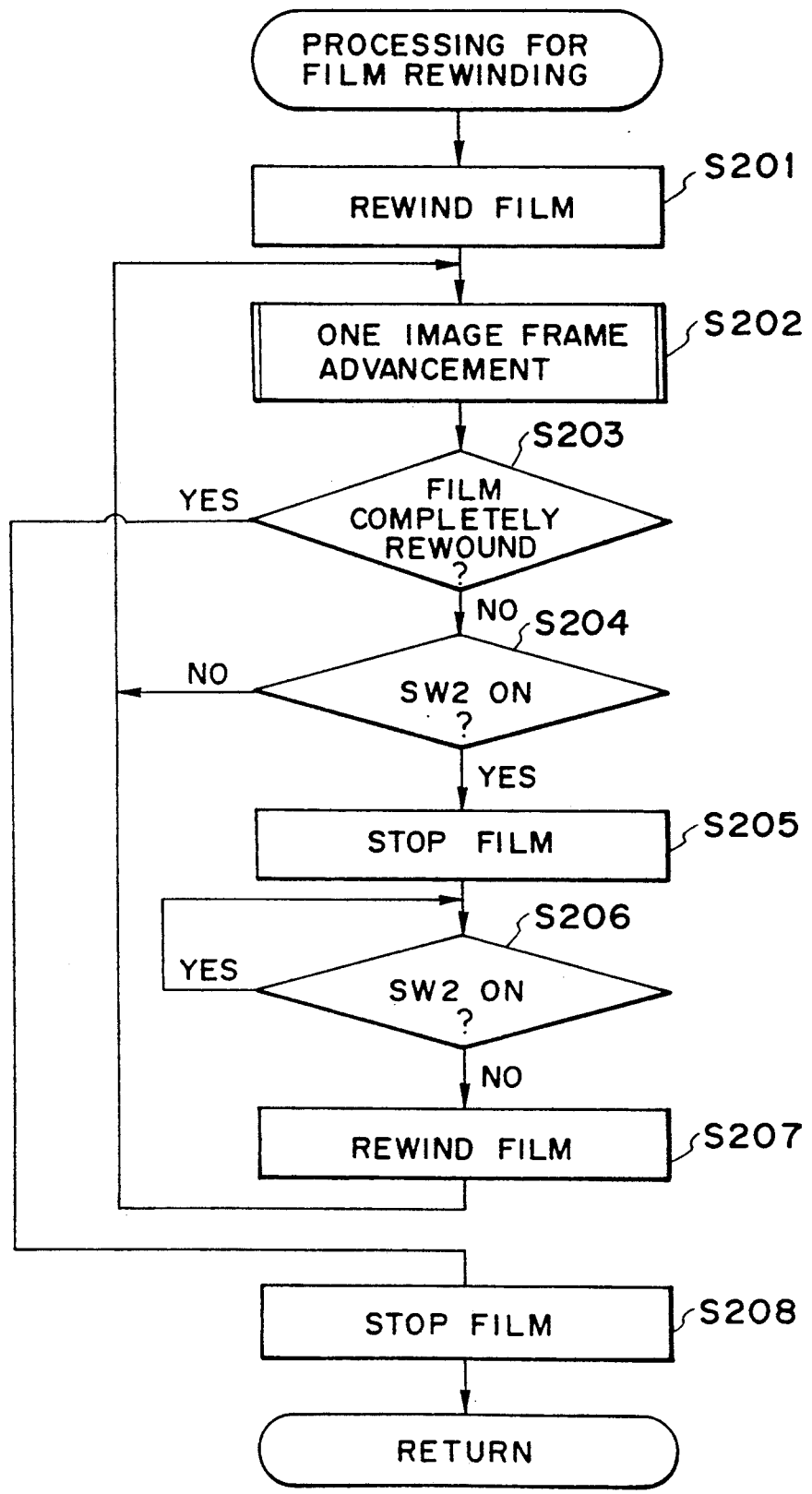
FIG. 3 is a flow chart of the control sequence for interruption of film rewinding in the first embodiment.

FIG. 3 is a flow chart of the control sequence for interrupting the film rewinding operation.

At first a step S201 starts the film rewinding operation, which is continued until a film stopping control is executed as will be explained later. Then a step S202 effects an image frame advancement which will be explained later in more detail with reference to FIG. 4. Then a step S203 discriminates whether the film has been completely rewound, and the sequence proceeds to a step S208 or S204 respectively if the film has been completely rewound or not. The step S204 discriminates whether the switch SW2 has been depressed, and, if not, the sequence returns to the step S202 for continuing the film rewinding. If the step S204 identifies that the switch SW2 has been depressed, the sequence proceeds to a step S205 for terminating the film rewinding. Then a step S206 discriminates whether the switch SW2 is still depressed, and, if depressed, the step S206 is repeated. On the other hand, if the step S206 identifies that the switch SW2 has been released, the sequence proceeds to a step S207 for re-starting the film rewinding, and the sequence then returns to the step S202. Consequently the film stops while the switch SW2 is depressed, and the film does not stop until an image frame is advanced.

On the other hand, if the step S203 identifies the film end, the sequence proceeds to the step S208 for stopping the film, whereupon the sequence returns to the main routine from which the above-explained subroutine was called.

Figure 4:
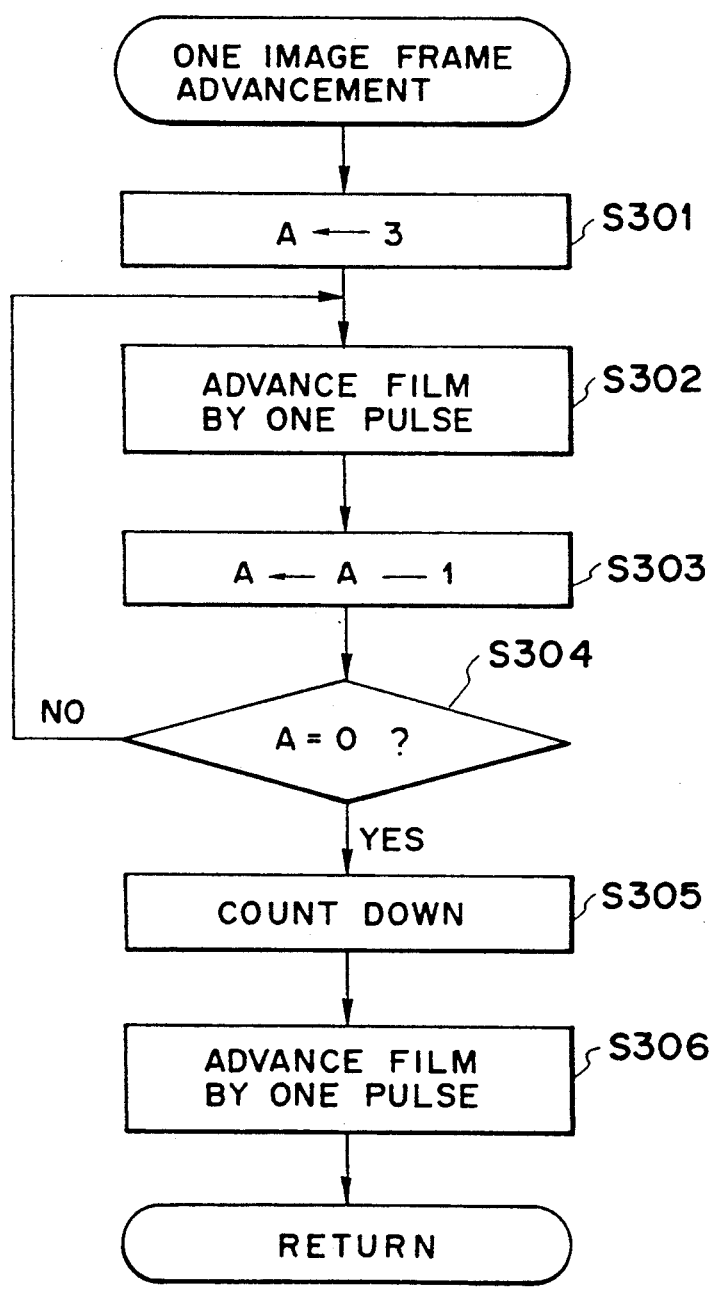
FIG. 4 is a flow chart of a down-counting sequence at three pulses in the first embodiment.

FIG. 4 is a flow chart showing the control sequence of an image frame advancement in the step S202 in FIG. 3.

At first a step S301 substitutes the variable A with a number "3". Then a step S302 awaits the film advancement corresponding to a pulse of the FSS signal explained in relation to FIG. 1. In the present embodiment, an image frame corresponds to four FSS pulses. Then a step S303 subtracts "1" from the variable A, and sets thus obtained result newly as the variable A. Then a step S304 discriminates whether the variable A is equal to "0", and the sequence proceeds to a step S305 or returns to the step S302, respectively if it is zero or not. Thus, by means of the steps S301 to S304, the sequence waits until the release of three FSS pulses. Then a step S305 releases a signal for decrement of the image frame number and display on the LCD B5. A next step S306 awaits the film movement by a pulse as in the step S302, and then the sequence returns to the subroutine shown in FIG. 3. Thus the steps S301 to S306 constitute an image frame movement, and the film counter effects down-counting prior to the completion of an image frame rewinding by an FSS pulse. In the present embodiment, said down-counting is conducted at the third FSS pulse, but it may be varied suitably according to the response speed of the display unit.

In the following there will be explained a second embodiment of the present invention, with reference to FIG. 5, which is a flow chart showing the control sequence for interrupting, with a stop period of several seconds, the film rewinding operation.

At first a step S401 starts the film rewinding operation, which is continued until a film stop control to be explained later. Then a step S402 effects an image frame advancement which was explained in relation to FIG. 4. Subsequently a step S403 discriminates whether the film has been completely rewound, and, the sequence proceeds to a step S409 or S404 respectively if the film has been completely rewound or not. The step S404 discriminates whether the switch SW2 has been depressed, and, if not, the sequence returns to the step S402 for continuing the film rewinding operation. If the step S404 identifies that the switch SW2 has been depressed, a step S405 terminates the film rewinding operation. Then a step S406 discriminates whether the switch SW2 is still depressed, and, if still depressed, the step S406 is repeated. If the step S406 identifies that the switch SW2 has been released, a step S407 waits for a period of several seconds, and the sequence then proceeds to a step S408. In this manner the present second embodiment additionally includes said step S407 for waiting for a period of several seconds, in comparison with the first embodiment. Because of this additional step, the film rewinding is interrupted for said waiting period, even after the switch SW2 is released. Then the step S408 restarts the film rewinding operation and the sequence returns to the step S402. Thus the film is stopped during the depression of the switch SW2, but does not stop until an image frame is advanced. When the step S403 identifies the film end, the step S409 stops the film and the sequence returns to the main routine from which the above-explained subroutine is called.

In the foregoing embodiments, the noise generation associated with the automatic film rewinding is not completely prevented, since the automatic film rewinding becomes interruptable by the on/off state of the switch SW2 only after the start of said automatic film rewinding operation.

However, in order to completely avoid such noise generation, it is also possible to inhibit in advance the automatic film rewinding operation prior to the start thereof. For example, complete prevention of such noise generation can be achieved by discriminating the on/off state of the switch SW2 in a period from the detection of end of the film to the start of automatic film rewinding operation, and inhibiting said automatic film rewinding if said switch SW2 is on. The film end can be detected from a fact that the film feeding motor does not rotate despite of power supply thereto.

The user can arbitrarily operate the operation means in the course of automatic film rewinding by the automatic film rewinding apparatus, and, in response to said operation, the automatic film rewinding operation is interrupted whereby the associated noise becomes no longer generated.

At the re-start of the film rewinding operation by termination of operation of said operation means, the film rewinding operation can be easily controlled as said interruption and re-start can be executed at every image frame, since the film rewinding operations can be controlled through an integrated control sequence.

As the down-count of the film counter is conducted at a predetermined timing prior to the completion of rewinding of an image frame, the image frame count is easily identified by the user and the film can therefore be stopped at any arbitrary position.

Also in this second embodiment, the automatic film rewinding operation is interrupted, after the operation of the operation means by the user, during said operation and an additional period of several seconds to several minutes thereafter, and is restarted after the lapse of said period. Therefore the user can place the camera for example in a bag, before the lapse of said period, thereby avoiding the leakage of noise of film rewinding to the outside.

The operation means serves to interrupt the automatic film rewinding operation only during said rewinding operation by the automatic film rewinding apparatus, and can serve to other functions at other times, so that the present invention can be realized without increase in the number of functional members and therefore without increase in the cost.

This invention is likewise applicable to a camera system, in addition to a camera.

What is claimed is:

1. An automatic film rewinding apparatus for use in a camera, comprising:
   stop means for interrupting an automatic film rewinding operation while said automatic film rewinding operation is conducted by the automatic film rewinding apparatus; and
   operation means to be operated for activating said stop means to cause said stop means to interrupt said automatic film rewinding operation;
   wherein said stop means includes means responsive to termination of operation of said operation means for automatically re-starting said automatic film rewinding operation in response to the termination.

2. An automatic film rewinding apparatus according to claim 1, further comprising:
   discrimination means for discriminating whether said operation means is being operated;
   said discrimination means operating to discriminate whether said operation means is being operated at the rewinding of each image frame of the film, and, in response to identification that said operation means is being operated, enabling the activation of said stop means to interrupt said automatic film rewinding operation.

3. An automatic film rewinding apparatus according to claim 1, further comprising:
   a film counter for counting the number of image frames of the film;
   wherein said film counter effects a decrement of the count at a predetermined timing, in the course of automatic film rewinding by an image frame prior to the completion of rewinding of that image frame.

4. An automatic film rewinding apparatus according to claim 1:
   wherein said stop means automatically re-starts said automatic film rewinding operation after a delay period of several seconds to several minutes after the termination of operation of said operation means.

5. An automatic film rewinding apparatus according to claim 1:
   wherein said operation means has another process function in addition to the activation of said stop means, and is operable to activate said stop means only during said automatic film rewinding operation and to perform said another process function at other times.

* * * * *